United States Patent
Nagae et al.

[11] Patent Number: 6,153,848
[45] Date of Patent: Nov. 28, 2000

[54] WELDING QUALITY DECISION APPARATUS AND WELDING MACHINE PROVIDED WITH THE SAME

[75] Inventors: Hiroki Nagae; Masaru Yoshida, both of Tokyo, Japan

[73] Assignee: Mitsubishi Denki Kabushiki Kaisha, Tokyo, Japan

[21] Appl. No.: 09/321,590

[22] Filed: May 28, 1999

[30] Foreign Application Priority Data

Dec. 7, 1998 [JP] Japan .................................. 10-347100

[51] Int. Cl.⁷ .................................................. B23K 11/25
[52] U.S. Cl. ............................................................ 219/110
[58] Field of Search .................................. 219/101, 109, 219/110, 130.21, 137 R, 97

[56] References Cited

U.S. PATENT DOCUMENTS

| | | | |
|---|---|---|---|
| 2,399,453 | 4/1946 | Sinclair | 219/97 |
| 3,681,563 | 8/1972 | Lifshits et al. | 219/97 |
| 4,296,305 | 10/1981 | Lifshits et al. | 219/101 |
| 4,645,896 | 2/1987 | Baba et al. | 219/100 |
| 5,304,768 | 4/1994 | Ishizaka | 219/110 |
| 5,714,734 | 2/1998 | Peterson et al. | 219/130.21 |

FOREIGN PATENT DOCUMENTS

| | | | |
|---|---|---|---|
| 3628246 | 4/1987 | Germany | 219/101 |
| 56-14093 | 2/1981 | Japan . | |
| 397287 | 1/1974 | U.S.S.R. | 219/137 R |

*Primary Examiner*—Clifford C. Shaw
*Attorney, Agent, or Firm*—Sughrue, Mion, Zinn, Macpeak & Seas, PLLC

[57] ABSTRACT

A welding quality decision apparatus having a high precision and a welding machine provided with the apparatus are provided. The welding quality decision apparatus according to the present invention is provided with a temperature detection apparatus for detecting a surface temperature of a member to be welded at a welding point after welding, a decision apparatus for comparing a temperature detection value detected thereby with a comparative reference value, and a control apparatus for controlling a welding machine on the basis of the decision result. Also, the welding machine according to the present invention is provided with above-described welding quality decision apparatus.

9 Claims, 4 Drawing Sheets

WELDING QUALITY DECISION APPARATUS AND WELDING MACHINE PROVIDED WITH THE SAME

BACKGROUND OF THE INVENTION

1. Field of the Invention

The present invention relates to a welding quality decision apparatus and a welding machine provided with the same apparatus for judging quality of a joint portion welded by, for example, a flash welding machine.

2. Description of the Related Art

FIG. 6 is a view showing a cut shape measurement apparatus to be used after flash trimming and disclosed in FIG. 3 of Japanese Examined Utility Model Publication No. 58-35372.

According to this publication, a laser beam is generated from ,a laser oscillator 104, a slit-like laser beam 106 is produced by a beam expander lens 105, and the laser beam 106 is irradiated onto a flash-trimmed welding joint 103 which is a substance to be measured.

When the weld joint 103 is subjected to the excessive or insufficient cut, a bumpy surface of the weld joint 103 results. The reflective light of the laser beam 106 becomes a ray of light of an uneven intensity. The reflective light is picked up by a television camera 107 and displayed on a monitor television set 108. The excessive or insufficient amount of cut is digitalized by a signal processing circuit 109 and a YES/NO decision circuit 110 where it is judged whether or not the amount is in the allowance range. In the case where the amount is out of the allowance range, an alarm signal is issued from an alarm 111.

Such a cut shape measurement apparatus is used not to make a decision of the welding quality but to measure the shape of the trimmed weld flash.

Also, the structure of a conventional flash welding machine is shown in, for example, Japanese Examined Patent Publication No. Hei 5-23877. This is shown in FIGS. 7 and 8.

In the shown machine, the welding machine and a trimmer are disposed in the same area, and the welding joint is trimmed after a steel plate has been flash welded while it is being clamped by electrodes.

In FIGS. 7 and 8, reference numerals 1 and 2 denote metal strips, reference numeral 3 denotes a common base, reference numeral 4 denote a stationary frame fixed to the common base 3, and reference numerals 5 and 6 denote upper and lower electrodes on the stationary side provided on the stationary frame 4. Reference numerals 7 and 8 denote upper and lower electrodes on the movable side provided on a movable frame 16, reference numeral 9 denotes a stationary-side rotary shear, 10 denotes a movable-side rotary shear, and reference numeral 11 denotes an upper trimmer cutting tool unit.

When the leading metal strip 1 stops at a predetermined position within the welding machine, the metal strip 1 is clamped and maintained by the stationary side upper and lower electrodes 5 and 6 and an auxiliary clamp.

Subsequently, the trailing metal strip 2 stops at a predetermined position within the welding machine, the metal strip 2 is clamped by the movable side upper and lower electrodes 7 and 8.

Thereafter, the rotary shears 9 and 10 positionally selected in the strip delivery direction from the rear side are advanced to cut each end of the strips 1 and 2.

When the end faces are thus refined, the movable frame 16 is advanced to abut the ends of the strips with each other. The flash weld is performed under the condition that the ends are in abutment with each other.

After the completion of the welding, under this condition without any change, the trimmer cutting tool unit 11 is advanced to complete the trimming operation.

In this welding machine, since the trimming operation is performed under the condition that the steel plates are clamped by the electrodes, when the trimming operation is being performed, the distance between the inlet side electrode frame and the outlet side electrode frame is very short. Accordingly, it is very difficult to perform the decision of the welding quality of the welding joint lay viewing. For this reason, the decision of the welding quality is made by the visual inspection after the welding joint port has been fed out of the welding machine.

However, in this method, when the welding fault is found it is necessary to return the steel plates back to the welding position within the welding machine in order to re-weld the part. Accordingly, the mechanism therefor is needed and at the same time, a remarkable time loss is caused to degrade the work efficiency.

Also, due to the visual inspection, it is impossible to quantitatively express the decision of the welding quality. The evaluation must depend upon the experience of the individual operator.

Also, the system suffers another problem that the rewelding must be performed manually.

In order to obtain the excellent welding quality, upon the welding operation, for example, upon the flashing operation, it is necessary to sufficiently heat the welding joint. If this heat is insufficient, it is impossible to perform the sufficient preparation, resulting in welding fault while impurities such as oxidant are left in the welding joint. Namely, it is one of the important factors for representing the welding quality to monitor the amount of the applied heat.

However, since it is difficult to directly measure the amount of applied heat itself, an object of the present invention is to provide a welding machine and an apparatus for performing the rewelding, in which the measurement of the amount of heat is indirectly measured by measuring a temperature, a color, a luster or the like of a member to be welded, such as the welding joint of the steel plate after welding so that on the basis of this, the quantitative decision of the welding quality is made and the rewelding operation can be automatically performed in case of the welding fault. Also, in addition, an object of the present invention is to overcome the above-described problems.

SUMMARY OF THE INVENTION

According to the present invention, there is provided a welding quality decision apparatus comprising: temperature detection means for detecting a surface temperature of a member to be welded at a welding point after welding; decision means for deciding whether or not a detected temperature value is higher than a comparative reference temperature value; and control means for controlling a welding machine on the basis of the decision result from said decision means.

Also, the welding quality decision apparatus according to the present invention is characterized in that the temperature detection means detects the surface temperature of the member to be welded at the same timing as that of trimming.

Also, according to the present invention, there is provided a welding quality decision apparatus comprising: color/ luster detection means for detecting a color/luster of a member to be welded at a welding point after welding; decision means for deciding whether or not a detected color/luster detection value is higher than a comparative reference color/luster value; and control means for controlling a welding machine on the basis of the decision result from said decision means.

The welding quality decision apparatus according to the present invention is characterized in that the color/luster detection means detects the color/luster of the member to be welded at the same timing as that of trimming.

Also, according to the present invention, there is provided a welding quality decision apparatus comprising: paint application means for applying a paint whose color changes in accordance with a temperature onto a trimming position immediately after trimming; color detection means for detecting surface color of said paint applied to the trimmed weld; decision means for deciding whether or not a detected color is higher than value with a comparative reference color value; and control means for controlling a welding machine on the basis of the decision result.

Also, the welding quality decision apparatus according to the present invention is characterized in that the comparative reference value is a compensation value set on the basis of experimental value.

Also, the welding machine of the present invention may comprise a welding quality decision apparatus that comprises temperature detection means for detecting a surface temperature of a member to be welded at a welding point after welding; decision means for deciding whether or not a detected temperature value is higher than a comparative reference temperature value; and control means for controlling a welding machine on the basis of the decision result from said decision means.

DETAILED DESCRIPTION OF THE PREFERRED EMBODIMENTS

The present invention will now be described by way of example with reference to the accompanying drawings.
Embodiment 1

Figure 1:
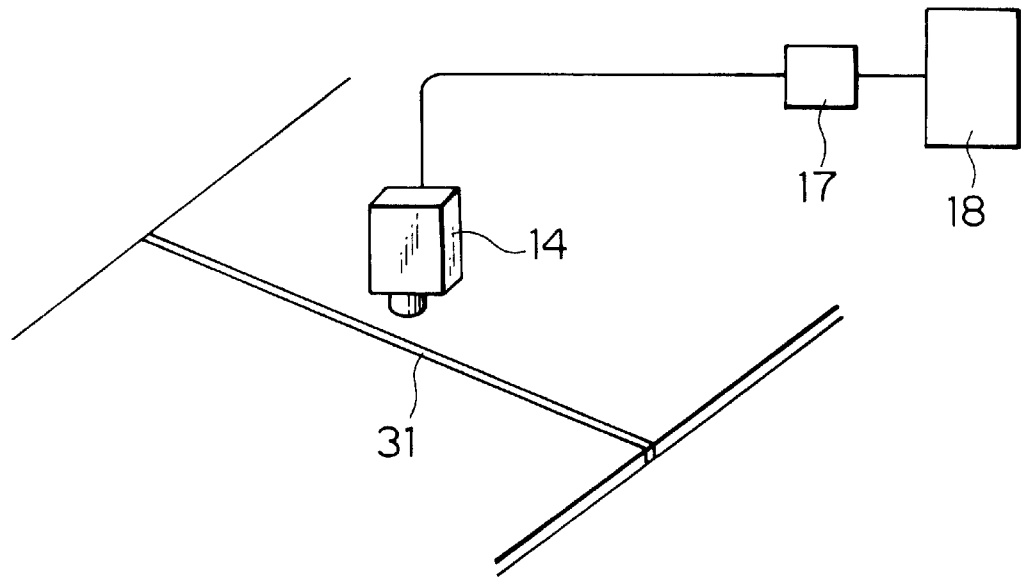
FIG. 1 is a schematic view showing a principle of a welding quality decision apparatus according to the present invention.
Figure 2:
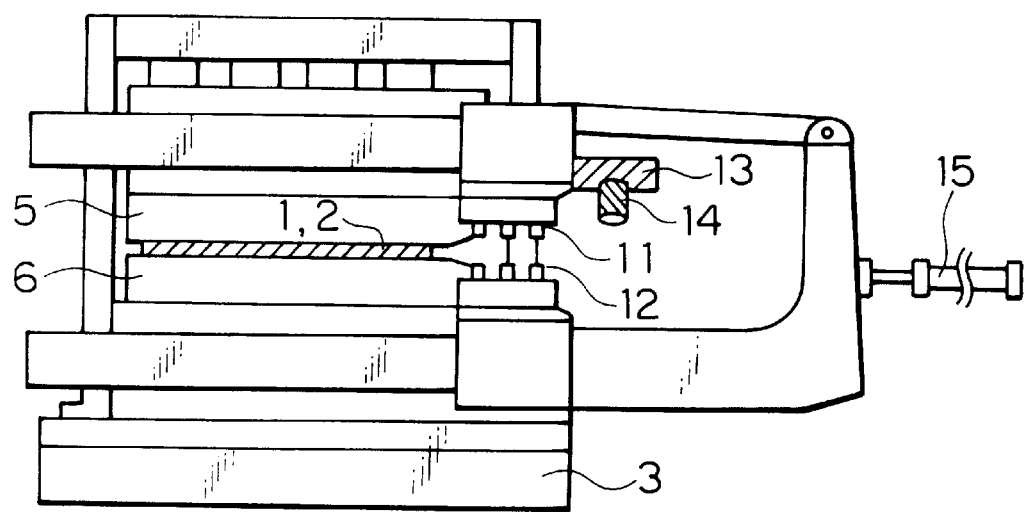
FIG. 2 is a side elevational view showing a delivery of a steel plate of a flash welding machine as viewed laterally.

The welding quality decision apparatus according to the first embodiment is provided with a temperature detection means for detecting a surface temperature of members to be welded at the welding point after the welding operation, a decision means for deciding whether or not a detected temperature value is higher than a comparative reference value, and control means for controlling the welding machine on the basis of the decision result. The temperature detection means is designed to detect a surface temperature of the member to be welded at the same timing as that of trimming. FIG. 1 is a schematic view showing a principle of the welding quality decision apparatus. FIG. 2 is a side elevational view of the delivery of the steel plate of the flash welding machine as viewed laterally.

In FIG. 2, reference numerals 11 and 12 denote trimmer cutting tool units each having three tools which are arranged to face the associated tools in the vertical direction and disposed above and below the passage of the steel plate passing through the machine for cutting the welding joint welded under the condition the leading plate 1 and the trailing plate 2 that are the steel plates as the members to be welded to be passed through the welding machine are in abutment with each other.

Reference numerals 5 and 6 denote clamps for fastening the steel plates 1 and 2. Reference numeral 14 denotes the temperature detection means for detecting the surface temperature of the members to be welded, i.e., the welding joint of the steel plates at the welding point after the trimming operation. The temperature detection means 14 is mounted on a bracket 13.

In FIG. 1, reference numeral 17 denotes the decision means for deciding the welding quality by comparing the temperature data, detected thereby, i.e., the temperature detection value with a predetermined comparative reference value. Reference numeral 18 denotes the control means.

Figure 4:
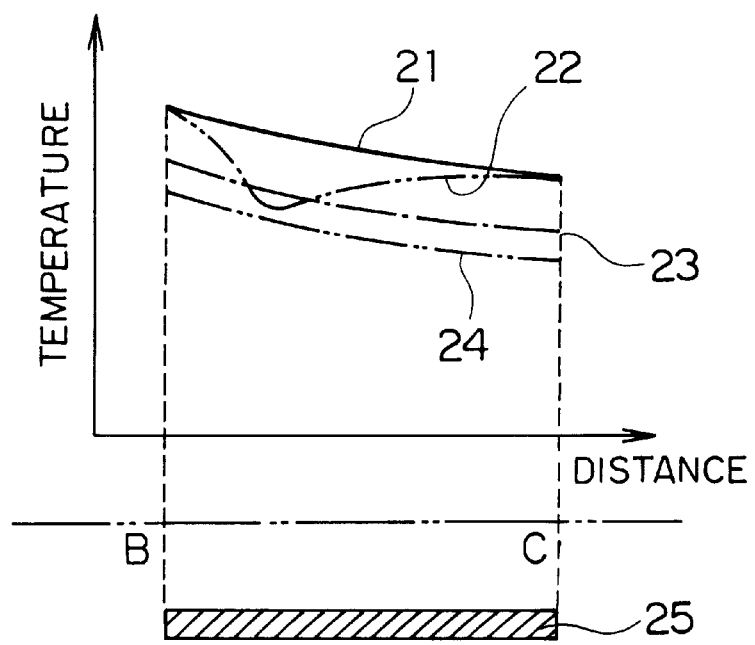
FIG. 4 is a view showing a temperature distribution along a welding line of a steel plate.

Also, FIG. 4 is a graph showing a temperature distribution of the surface of the welding joint of the steel plates. In FIG. 4, reference numeral 21 denotes an ideal value of the temperature change in case of the measurement along a welding line, reference numerals 22 and 24 denote examples of the temperature change, and reference numeral 23 denotes a compensation value, i.e., a threshold value i.e., a comparative reference value for decision in consideration of the temperature change. Incidentally, reference numeral 25 denotes a cross-section of the steel plate at the welding point.

Figure 7:
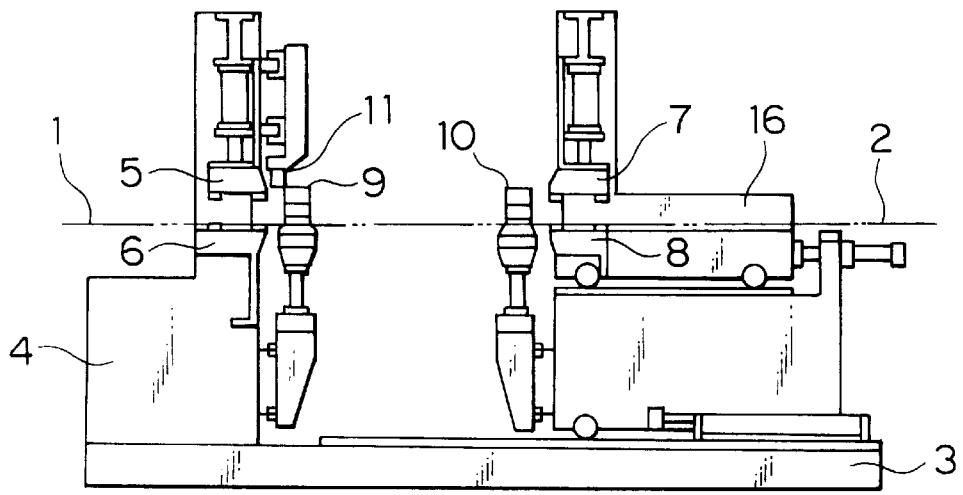
FIG. 7 is a side elevational view showing the conventional system.
Figure 8:
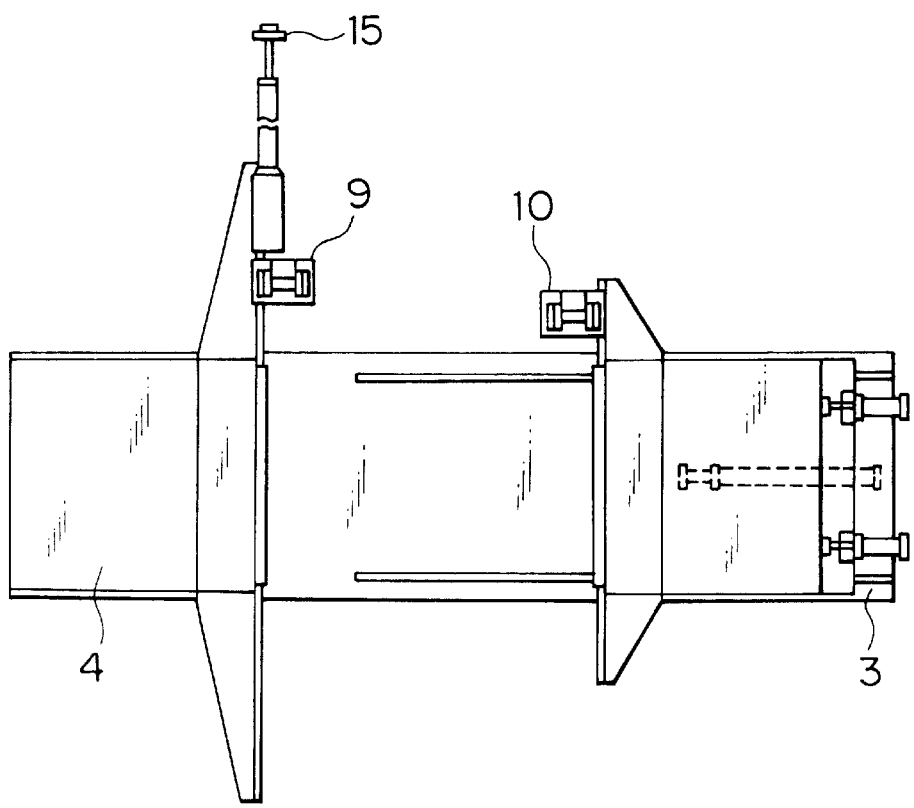
FIG. 8 is a side elevational view showing the conventional system.

The operation will now be described also with reference to the conventional welding machine shown in FIGS. 7 and 8.

After the leading plate, i.e., the steel plate 1 as the metal strip and the trailing plate, i.e., the steel plate 2 also as the metal strip have been flash-welded together under the abutment condition, the flash is cut, with the plate clamped by the clamps 5 and 6 as well as by the clamps 7 and 8, between the stationary carrier 4 used as the stationary frame and the movable carrier 16 used as the movable frame by the trimmer cutting tool units 11 and 12 which are moved in the widthwise direction of the plate by a cylinder 15 used as a movement drive means. At the same time, the surface temperature of the welding point after the trimming is measured and detected by a radiation thermometer 14 used as the temperature detection means installed in the vicinity of the trimmer cutting tool units 11 and 12.

By the way, the temperature of the welding point is momentarily decreased immediately after the flash welding. Also, the thermometer is installed in the vicinity of the trimmer cutting tool units 11 and 12, and the detection operation, i.e., the temperature measurement is performed substantially at the same timing as that of the trimming. Accordingly, if the temperature of the steel plate as the plate to be welded from point B to point C in FIG. 4 is measured along the welding line, the surface temperature of the measurement point is decreased during the measurement from point B to point C. The surface temperature curve of the steel plate is ideally shown by the curve 21.

For this reason, the "threshold value" 23 used as the compensation value in consideration of the change 21 of the temperature of the steel plate in accordance with a lapse of time, i.e., the experimental value is set as the comparative reference value to thereby make it possible to more accurately decide the welding quality.

The decision circuit 17 used as the decision means compares the measured temperature as the detection value with the threshold value that is the compensation value as the comparative reference value in the comparator circuit. If the measurement value exceeds the threshold value, a signal representative of this fact is outputted to the control apparatus 18.

If the detected temperature value is equal to or lower than the threshold value, a signal representation of that the welding was not acceptable is generated.

The control apparatus 18 controls the welding machine on the basis of the signal representative of that fact, thereby starting the rewelding.

For instance, in the case where as the result of the temperature measurement along the welding line, the temperature curve like the curve 22 or the curve 24 in FIG. 4 is obtained, since the threshold value 23 is partly or entirely lowered below the threshold value 23 in either case, the signal representative of this fact is transmitted to the control apparatus 18 by the decision circuit 17. The rewelding operation is started in the welding machine on the basis of the command of the control apparatus 18.

In the first embodiment, the welding quality is quantitatively and automatically decided, and the rewelding operation is automatically performed if necessary.

Embodiment 2

In the first embodiment, the example is shown in which the non-contact type thermometer 14 is used as the temperature detection means for detecting the temperature and the measurement is performed at one point in the advance direction of the steel plate. However, the invention is not limited to this embodiment and it is possible to adopt, for example, a structure in which several thermoimage elements are arranged in the advance direction of the steel plate.

Figure 5:
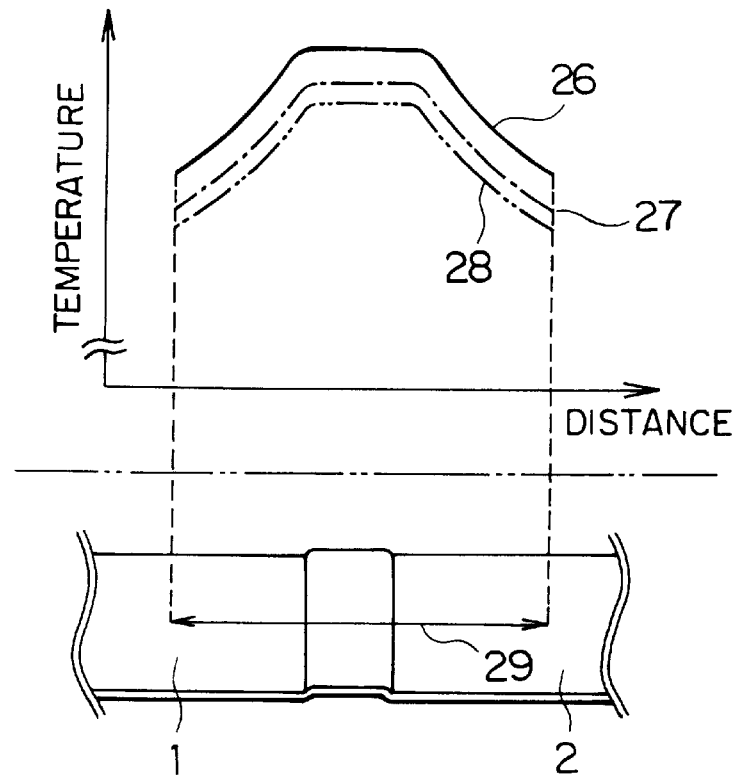
FIG. 5 is a view showing a temperature distribution along a line traversing the welding line of the steel plate.
Figure 6:
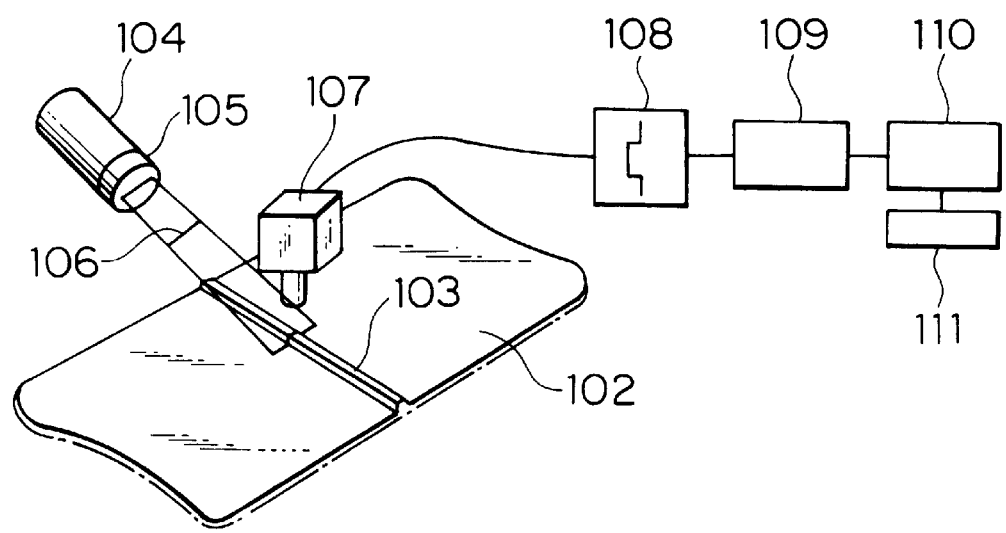
FIG. 6 is a schematic view showing a conventional system.

In FIG. 5, reference numeral 26 denotes a temperature distribution of a steel plate in a direction perpendicular to the widthwise direction of the plate, reference numeral 27 denotes a compensated threshold value for decision, reference numeral 28 denotes an example of the temperature change, and reference numeral 29 denotes a detection measurement range. In the case where the temperature detection value is below the threshold value as shown in the case 28, the decision means decides that the sufficient amount of heat is not applied, and thus performs the rewelding operation in the welding machine through the control means 18.

Incidentally, it is possible to perform the wide range of the measurement and decision by detecting and measuring the temperature distribution 26 in the vicinity of the welding point in the widthwise direction of the plate as shown in FIG. 5. It is thus possible to obtain the more accurate decision result of the welding quality.

Embodiment 3

In the above-described first and second embodiments, the temperature is selected as the factor for making a decision of the welding quality. The present invention is not limited to this but it is possible to make a decision depending upon color and luster. In order to perform the suitable welding operation, it is necessary to apply a sufficient amount of heat to, for example, the welding joint of the steel plate as the base member, i.e., the member to be welded when the flash welding is performed.

Since the base member has heat after the flash trimming operation, the base member forms an oxide film with the reaction with the oxygen contained in the atmosphere. For instance, if the sufficient amount of heat is applied, the oxide film is likely to be formed and its color is blue. If the sufficient amount of heat is not applied, the color of the base member after the trimming is not blue.

Accordingly, in the structure shown in FIG. 2, a color/luster detection means is used as a detector and a sensor that may detect the color/luster, instead of the temperature detection means. The color/luster detection means makes the decision of the welding quality. The threshold value is set as the compensation value from the experimental data in the same way as in the foregoing embodiments for the color/luster detection value detected by the color/luster detection means. The decision means makes the decision by using the threshold value of the color/luster as the comparative reference value. For instance, in the case where the welding is faulty, in response to the decision result, the automatic rewelding is performed in the welding machine through the control means 18, thereby obtaining the same effect as that of the above-described first embodiment.

Embodiment 4

In the third embodiment, the color of base member is directly measured. However, as shown in FIG. 3, for example, a paint whose color is changed in accordance with a temperature, i.e., a thermopaint is applied to, for example, the vicinity of the trimmer cutting tool units and it is possible to detect the paint color by the color/luster detection means.

Figure 3:
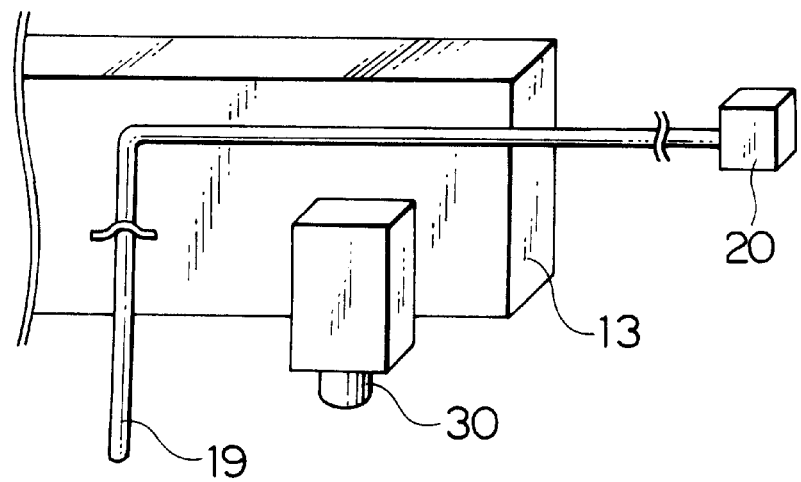
FIG. 3 is a perspective view showing a primary part of the welding machine provided with a paint application means.

In FIG. 3, reference numeral 19 denotes a nozzle for injecting the paint, reference numeral 20 denotes a reservoir for reserving the paint therein, and reference numeral 30 denotes the color/luster detection means for detecting the color/luster.

When the paint is injected from the nozzle 19 to the welding joint, the color of the paint sprayed thereon is changed in accordance with the temperature of the welding joint of the steel plate. This color is detected by the color/luster detection means. This detection value is compared with the comparison reference value on the basis of the experimental data by the decision means for the decision. As a result, not only the same effect as that of the above-described third embodiment is exhibited but also the color is exhibited more clearly than the third embodiment. It is therefore possible to make a more accurate decision.

According to the present invention, since the amount of applied heat is measured indirectly by using the detection means for detecting the color/luster or the temperature of the welding point at the trimming position, and the detection value is compared with the comparative reference value based upon the experimental value, to thereby make a decision of the welding quality of the welding joint part. It is therefore possible to perform the highly accurate welding quality decision.

Also, according to the present invention, since the compensation value is used further in consideration of the experimental value for the comparative reference value, it is possible to perform a welding quality decision with more precision.

Also, according to the present invention, the control means controls the welding machine on the basis of the decision result by the decision means. For instance, it is possible to perform the rewelding operation automatically immediately after the decision. Accordingly, in comparison with the conventional system in which the product once fed out of the welding machine is returned back to the welding position of the welding machine through the visual inspection of the skilled artisan, it is possible to automatically perform the homogenous welding quality decision with high precision. In addition, in case of the welding fault, the rewelding operation is automatically performed immediately at the welding position. It is therefore possible to considerably shorten the working process and the time to thereby greatly contribute to the increase in yield.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A welding quality decision apparatus comprising:

temperature detection means for detecting a surface temperature of a member to be welded at a welding point after welding;

decision means for deciding whether or not a detected temperature value is higher than a comparative reference temperature value; and control means for controlling a welding machine on the basis of the decision result from said decision means.

2. The welding quality decision apparatus as claimed in claim 1, wherein said quality decision apparatus is adapted to be mounted to the welding machine which includes a trimmer for trimming the member to be welded; and wherein said temperature detection means is adapted to detect the surface temperature of the member to be welded at a same timing as that of trimming.

3. The welding quality decision apparatus as claimed in claim 1, wherein the comparative reference value is a compensation value that is based on a lapse of time between welding and detecting the surface temperature at the weld point.

4. A welding machine, comprising:

a weld trimmer;

a quality decision apparatus;

color/luster detection means for detecting a color/luster of a member to be welded at a welding point after welding;

decision means for deciding whether or not a detected color/luster detection is higher than a comparative reference color/luster;

control means for controlling a welding machine on the basis of the decision result from said decision means; and wherein said color/luster detection means is adapted to detect the color/luster of the member to be welded during trimming by said weld trimmer of a weld on the member to be welded.

5. The welding machine as claimed in claim 4, wherein said color/luster detection means includes a sensor mounted to said trimmer for detecting the color/luster of the member to be welded at the welding point after welding.

6. A welding quality decision apparatus comprising:

paint application means for applying a paint whose color changes in accordance with a temperature onto a trimming position immediately after trimming;

color detection means for detecting surface color of said paint applied to the trimmed weld;

decision means for deciding whether or not a detected color value is higher than a comparative reference color value; and control means for controlling a welding machine on the basis of the decision result.

7. A welding machine comprising a welding quality decision apparatus that comprises temperature detection means for detecting a surface temperature of a member to be welded at a welding point after welding; decision means for deciding whether or not a detected temperature value is higher than a comparative reference temperature value; and control means for controlling a welding machine on the basis of the decision result from said decision means.

8. A welding quality decision apparatus comprising:

a paint applicator which applies a paint, whose color changes in accordance with a temperature, onto a trimming position immediately after trimming a weld;

a color detector which detects surface color of said paint applied to the trimmed weld;

a decision circuit which decides whether or not a detected color value is higher than a comparative reference color value; and a controller which controls a welding machine on the basis of the decision result.

9. A welding machine comprising a welding quality decision apparatus that comprises temperature measuring device which detects a surface temperature of a member to be welded at a welding point after welding; a decision circuit which decides whether or not a detected temperature is higher than a comparative reference value; and controller which controls a welding machine on the basis of the decision result from said decision circuit.

* * * * *